Patented June 22, 1954

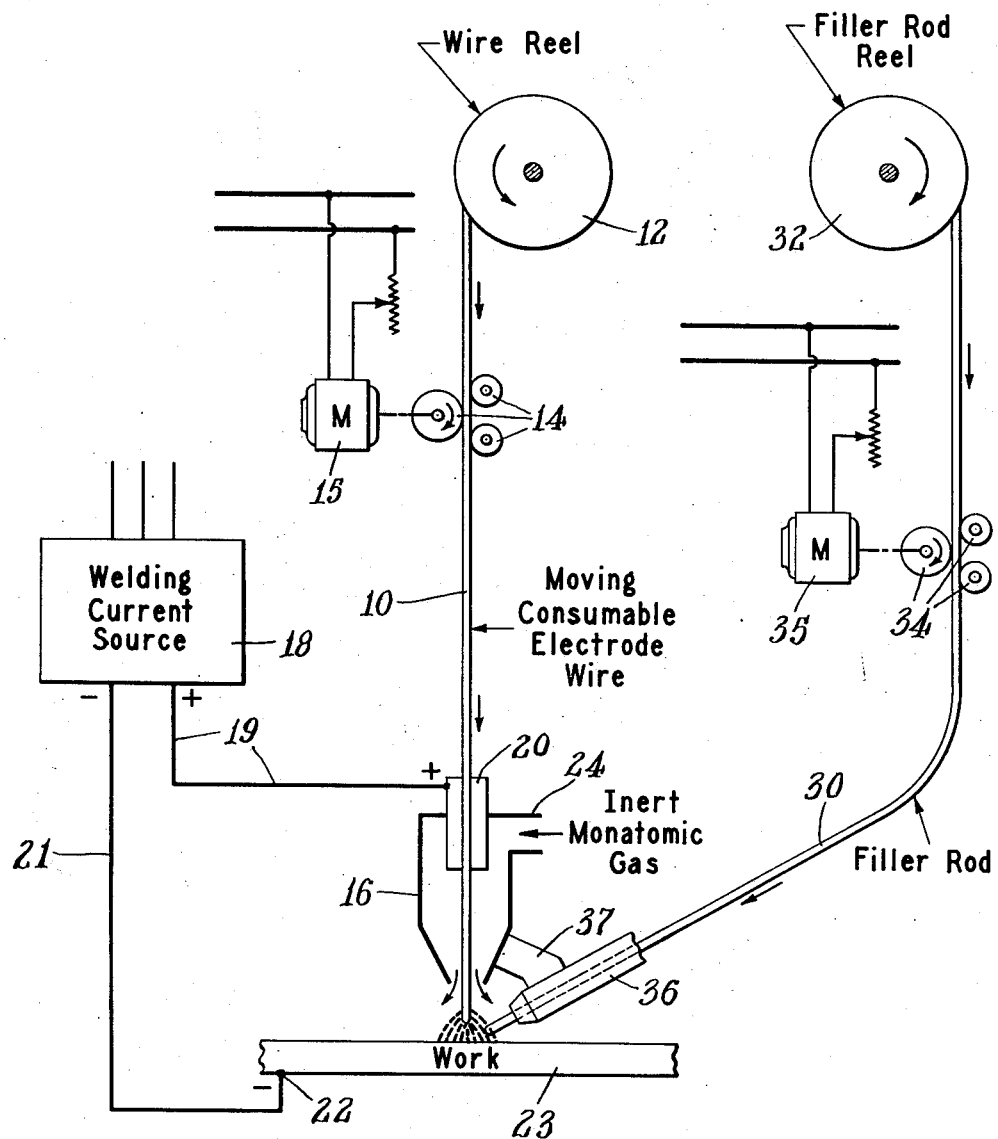

2,681,970

UNITED STATES PATENT OFFICE 2,681,970

GAS SHIELDED METAL ARC WELDING METHOD

Kenneth H. Koopman, Fanwood, N. J., assignor to Union Carbide and Carbon Corporation, a corporation of New York Application February 19, 1951, Serial No. 211,653

3 Claims. (Cl. 219—10)

This invention relates to a gas shielded metal arc welding method in which an arc is struck between the end of a moving wire electrode and a workpiece, both connected to a source of welding current, to consume the electrode and transfer metal therefrom through the arc stream to form on the workpiece a weld puddle, and a stream containing essentially inert gas is passed along the moving electrode to shield the arc stream and weld puddle.

Objects of the present invention are to increase the metal deposition rate for a given electrical power input, to decrease the weld penetration into the base metal, to decrease the quantity of inert gas employed per pound of metal deposited, and to decrease or eliminate weld spatter and undercutting.

According to the present invention, these objects are accomplished by feeding additional metal from a separate source into the gas shielded puddle to increase the weld deposition rate of the resultant welding operation above that of the metal arc stream. The additional metal is preferably in the form of a filler rod, which is an auxiliary or external rod, generally of the same metal composition as the wire electrode, and continuously but separately fed into the inert gas shielded weld puddle at a substantially constant rate, without substantially increasing the amount of welding current or the flow of inert gas.

The addition of the cold filler rod materially cools the metal arc stream and the weld puddle, and is believed to interfere with the mechanical force of the metal arc stream to reduce its penetration into the base metal or workpiece. Less vaporization occurs in the metal arc stream, which reduces or eliminates weld spatter. The molten weld metal fills the base metal crater more completely. Undercutting is reduced or eliminated, which is of particular advantage in welding of ferritic and pearlitic steels.

In the drawing, the single figure is a diagram of apparatus for carrying out the process according to the present invention.

As shown in the drawing, the consumable electrode wire 10 is supplied by a reel 12 from which it is unwound by nip rollers 14 driven by a motor 15 and which feed the wire 10 to a nozzle 16. A source of welding current 18 has one terminal 19 preferably positive connected to a contactor 20 engaging the moving wire 10, and the other terminal 21 connected at 22 to the workpiece or base metal 23. A stream containing essentially inert monatomic gas such as argon or helium is supplied to the nozzle 16 by a conduit 24.

An auxiliary or supplemental filler rod 30 is supplied by a reel 32 from which it is unwound by nip rollers 34 driven by a motor 35 and which feed the filler rod 30 to a guide 36, preferably rigidly secured to the nozzle 16, by a strut 37. The filler rod 30 is preferably insulated from the electrode wire 10.

In operation, the flow of inert gas in the conduit 24 is turned on to flow out of the nozzle 16. Then the source of welding current 18 is turned on to energize the contact 20 and the work 23. Then the motor 15 is started and the nip rollers 14 draw the electrode wire 10 from the reel 12 and feed it past the contact 20 and through the nozzle 16. When the end of the moving wire 10 approaches the work 23, an arc is struck, the arc and moving electrode wire and weld puddle being shielded by the annular stream of gas from the nozzle 16.

The motor 35 is now started, and the nip rollers 34 draw the filler rod 30 from the reel 32 and fed through the guide 36 into the arc stream between the end of the wire 10 and the work 22.

The rate of metal deposition can be at least approximately doubled for a given electrical power input. The increase in rate of metal deposition varies somewhat with the particular metal of the electrode, filler metal and base metal, and the diameters of the electrode wire and the filler rod, and the thickness of the base metal. On this basis, the efficiency of the use of the power input is about doubled. For example, in depositing a $\frac{3}{32}$ inch diameter copper-silicon-manganese alloy wire electrode fed at a rate of 115 inches per minute on cast iron with 325 amperes direct current reverse polarity and 30 volts with an argon flow of 50 cubic feet per hour, the rate of metal deposition was 14.6 pounds per hour. When a filler rod of copper-silicon-manganese alloy of $\frac{1}{16}$ inch diameter was fed into the arc at a speed of 276 inches per minute an additional 15.5 pounds per hour were deposited. When the filler rod was fed at a rate of 225 inches per minute into the arc under the same conditions the additional deposition rate was 13 pounds per hour. In other words, the rate of metal deposition was approximately doubled by feeding the external welding rod into the arc.

Another example in depositing $\frac{1}{8}$ inch diameter aluminum alloy wire fed at a rate of 276 inches per minute on aluminum with 425 amperes, 27 volts direct current reverse polarity and an argon flow of 65 cubic feet per hour, the rate of deposition was 8.25 pounds per hour. When filler rod of $\frac{3}{32}$ inch diameter aluminum alloy was fed at 240 inches per minute into the arc under the same conditions an additional 9.5 pounds per hour was deposited.

The increase in the rate of metal deposition thus attained is accomplished without any increase in the inert gas flow through the gas nozzle shielding the wire electrode which has the arc established between its end and the base metal or workpiece.

The penetration of the arc into the base metal can be reduced any desired amount by the rate at which the filler rod is fed into the arc stream. For example, by feeding $\tfrac{1}{16}$ inch diameter copper-silicon-manganese alloy filler rod at a high rate the penetration into cast iron was reduced from a range of $\tfrac{1}{8}$ inch to $\tfrac{3}{16}$ inch to a range of a few thousandths to $\tfrac{3}{32}$ inch. The more accurate control of the penetration into the base metal is of particular advantage in reducing the penetration to a very slight amount for specific operations, such as cladding or surfacing with welding rods having compositions different from the base metal.

A desirable speed range of filler rod feed is from 50 to 1000 inches per minute. For example, some metals are better fed by means of small diameter filler rods at high speed, whereas other metals can be fed by larger filler rods at low speed.

The diameters of filler rods that have been used are $\tfrac{1}{16}$, $\tfrac{3}{32}$ and $\tfrac{1}{8}$ inch. Any size from $\tfrac{3}{32}$ to $\tfrac{1}{4}$ inch in diameter can be fed. The maximum size of filler rod that can be fed externally into the arc stream will depend upon the type of metal itself. For example, a larger bronze rod could be fed without disturbing the arc than an aluminum rod.

Tests have indicated that it is advisable to feed the external filler rod into the arc stream at the front end of the weld puddle so that the end of the rod contacts the base metal or is not more than $\tfrac{1}{8}$ inch above the base metal.

The argon metal arc with filler rod feed process has been applied to the deposition of aluminum on aluminum and bronze on cast iron. This method is applicable to practically all metals and combinations of metals that are commonly welded. The angle of incidence of the filler rod to the workpiece can vary from about 5 to 60° or more.

I claim:

1. Method of gas shielded metal arc welding with a motor driven moving wire electrode being unwound from a reel and connected to a source of welding current, which comprises striking an arc between the end of said wire electrode and a workpiece connected to said source to consume said electrode and transfer metal therefrom through the arc stream to form on said workpiece a weld puddle, passing a stream containing essentially inert gas along said moving electrode to shield the arc stream and weld puddle, feeding said electrode wire from its reel toward the arc at a speed of the order of 100 inches per minute, supplying welding current from said source to the electrode and workpiece at a strength sufficient to consume the wire electrode at said rate, and feeding unenergized additional metal wire from a separate reel into said gas shielded weld puddle at a rate of from 50 to 1000 inches per minute to increase the metal deposition rate of the resultant welding operation above that of the arc stream without substantially increasing the strength of said welding current supplied to said electrode wire.

2. Method of gas shielded metal arc welding with a motor driven moving cuprous metal wire electrode being unwound from a reel and connected to a source of welding current, which comprises striking an arc between the end of said cuprous metal wire and a metal workpiece connected to said source to consume said cuprous metal electrode and transfer cuprous metal therefrom through the arc stream to form on said metal workpiece a weld puddle, passing a stream containing essentially inert gas along said moving cuprous metal wire electrode to shield the arc stream and weld puddle, feeding said cuprous metal electrode from its reel toward the arc at a speed of the order of 100 inches per minute, supplying welding current from said source to said moving cuprous metal wire electrode and said metal workpiece at a strength sufficient to consume said cuprous metal wire electrode at said rate, and feeding unenergized additional cuprous metal wire from a separate reel into said gas shielded weld puddle at a rate of from 50 to 1000 inches per minute to increase the metal deposition rate of the resulting welding operation above that of the arc stream without substantially increasing the strength of said welding current supplied to said electrode wire.

3. Method of gas shielded metal arc welding with a motor driven moving aluminum wire electrode being unwound from a reel and connected to a source of welding current, which comprises striking an arc between the end of said aluminum wire and an aluminum workpiece connected to said source to consume said aluminum electrode and transfer aluminum metal therefrom through the arc stream to form on said aluminum workpiece a weld puddle, passing a stream containing essentially inert gas along said moving aluminum wire electrode to shield the arc stream and weld puddle, feeding said aluminum electrode from its reel toward the arc at a speed of the order of 100 inches per minute, supplying welding current from said source to said moving aluminum wire electrode and said aluminum workpiece at a strength sufficient to consume said aluminum wire electrode at said rate, and feeding unenergized additional aluminum wire from another reel into said gas shielded weld puddle at a rate of from 50 to 1000 inches per minute to increase the metal deposition rate of the resulting welding operation above that of the arc stream without substantially increasing the strength of said welding current supplied to said electrode wire.

References Cited in the file of this patent

UNITED STATES PATENTS

| Number | Name | Date |
|---|---|---|
| 2,342,086 | Meredith | Feb. 15, 1944 |
| 2,504,868 | Muller | Apr. 18, 1950 |

OTHER REFERENCES

Engineering News-Record, vol. 132, No. 16, pp. 87–89, April 20, 1944. (Copy in Division 37.)